United States Patent [19]
Hosomi

[11] Patent Number: 6,151,596
[45] Date of Patent: Nov. 21, 2000

[54] INFORMATION PROVIDING SYSTEM

[75] Inventor: Itaru Hosomi, Tokyo, Japan

[73] Assignee: NEC Corporation, Tokyo, Japan

[21] Appl. No.: 09/135,562

[22] Filed: Aug. 18, 1998

[30] Foreign Application Priority Data

Aug. 18, 1997 [JP] Japan .................................. 9-236565

[51] Int. Cl.⁷ ................................................ G06F 17/30
[52] U.S. Cl. .............................. 707/1; 707/513; 707/522
[58] Field of Search .............................. 707/1, 522, 513; 709/205; 345/356; 703/13; 713/100; 359/463

[56] References Cited

U.S. PATENT DOCUMENTS

| | | | |
|---|---|---|---|
| 4,764,867 | 8/1988 | Hess ........................................... | 345/356 |
| 5,133,063 | 7/1992 | Naito et al. ................................ | 703/13 |
| 5,543,964 | 8/1996 | Taylor et al. ............................ | 359/463 |
| 5,682,529 | 10/1997 | Hendry et al. ........................... | 713/100 |
| 5,835,922 | 11/1998 | Shima et al. ............................ | 707/522 |
| 5,848,427 | 12/1998 | Hyodo ...................................... | 707/513 |

FOREIGN PATENT DOCUMENTS

| | | |
|---|---|---|
| 63-40455 | 2/1988 | Japan . |
| 63-174181 | 7/1988 | Japan . |
| 4-178771 | 6/1992 | Japan . |
| 4-280378 | 10/1992 | Japan . |
| 5-14660 | 1/1993 | Japan . |

OTHER PUBLICATIONS

K. Arai, "Information Service Environment Navigation Technology", NTT R&D, vol. 44, No. 10, Oct. 10, 1995, pp. 887–894.

N. Baito, "HTML with the Demise of the Trend Role", (Jul. 1996), pp. 172–177.

*Primary Examiner*—Wayne Amsbury
*Assistant Examiner*—Frantz Coby
*Attorney, Agent, or Firm*—Sughrue, Mion, Zinn, Macpeak & Seas, PLLC

[57] ABSTRACT

An information providing system is mainly configured by a terminal and an information storage equipment. The terminal is manipulated by a user to issue an information obtainment request, wherein it has a specific output condition, which is defined by a picture output function and/or a sound output function. The information storage equipment extracts a number of digital information elements to suit the information obtainment request, so that the digital information elements are synthesized together into digital information in accordance with a default (information) providing manner, which represents a specific display screen whose screen size and layout are determined in advance. Then, the digital information is transmitted to the terminal, which in turn provides the user with content of the digital information by using pictures and/or sounds. If the default providing manner does not match with the output function of the terminal, the information storage equipment changes the default providing manner by one of change methods, which is selected in consideration of the preset priority. Thus, the digital information elements are synthesized together into the digital information in accordance with the changed providing manner. Incidentally, if the terminal does not have a necessary software module required for outputting the digital information, the terminal downloads it from its resource.

12 Claims, 18 Drawing Sheets

| OUTPUT FUNCTION | PARAMETER | PARAMETER VALUE |
|---|---|---|
| DISPLAY_resolution | (Xpixel, Ypixel) | (640, 480) |
| DISPLAY_picture | ABLE/DISABLE | ABLE |
| SOUND | ABLE/DISABLE | DISABLE |

FIG.5A

RULE 1

| CONDITION | client.disp.Xpixel < default.disp.Xpixel |
|---|---|
| CHANGE METHOD 11 | element1.menu→popup |
| CHANGE METHOD 12 | disp.Xpixel→fit(client.disp.Xpixel) |

FIG.5B

RULE 2

| CONDITION | client.disp.Ypixel < default.disp.Ypixel |
|---|---|
| CHANGE METHOD 21 | element3.advertisement→temporary |
| CHANGE METHOD 22 | element1.menu→popup |
| CHANGE METHOD 23 | disp.Ypixel→fit(client.disp.Ypixel) |

| PROVIDING INFORMATION | SOFTWARE MODULE | RESOURCE |
|---|---|---|
| OPENING.mpg | MPEG_player_v2.1 | http://www.*./MPEGplayer2.1 |
| BGM3.mid | GM_player | http://www.*./GMplayer |
| Image1.wmk | Watermark_viewer | http://www.*./WMviewer |

INFORMATION PROVIDING SYSTEM

BACKGROUND OF THE INVENTION

1. Field of the Invention

This invention relates to information providing systems that provide users of terminals with digital information representing texts and pictures. This application is based on patent application No. Hei 9-236565 filed in Japan, the content of which is incorporated herein by reference.

2. Description of the Related Art

FIG. 19 shows an example of the information providing system that provides a user with digital information representing texts and pictures. The information providing system of this example is mainly configured by a terminal 100 and an information storage equipment 200. The terminal 100 has an input unit 101 such as a keyboard, an output unit 102 such as a CRT display and/or a speaker, an information request unit 103 and an information output unit 104. The information storage equipment 200 is configured by an information management unit 201 and an information construction unit 202.

In FIG. 19, when the user manipulates the input unit 101 to request obtainment of information, the information request unit 103 of the terminal 100 requests the information storage equipment 200 to provide desired information. In the information storage equipment 200, the information construction unit 202 extracts digital information suited to the aforementioned request from the information management unit 201. Herein, the information construction unit 202 directly provides the information request unit 103 of the terminal 100 with the digital information. Or, the information construction unit 202 synthesizes (or aligns) the digital information to suit a prescribed format, so that the synthesized digital information is supplied to the information request unit 103. Thus, the information request unit 103 obtains the digital information, which is then sent to the information output unit 104. Thus, the information output unit 104 outputs the digital information by the output unit 102.

The foregoing information storage equipment 200 can be configured as a single relational database system. In this case, the information construction unit 202 is configured by a SQL interpreter (where "SQL" is an abbreviation for "Structured Query Language") and a VIEW creation function, while the information management unit 201 corresponds to a retrieval function and a database. In addition, the information request unit 103 of the terminal 100 corresponds to a database application program that creates and transmits SQL commands.

Further, it is possible to define the information request unit 103 as WWW browser (where "WWW" is an abbreviation for "World Wide Web") while defining the information storage equipment 200 as WWW server system. Furthermore, it is possible to define the information construction unit 202 and the information management system 201 as database system on the WWW server system. In that case, the foregoing information providing system of FIG. 19 shows a typical type of the known information providing system using the WWW and database.

FIG. 20 shows another example of the information providing system. Different from the foregoing system of FIG. 19, the information providing system of this example is configured using an information storage equipment 300, which is configured by an information storage unit 301 and an information management unit 302. In some case, it is possible to combine the information request unit 103 and the information management unit 302 together. In FIG. 20, it is possible to define the information request unit 103 as "shell" of UNIX while defining the information management unit 302 as UNIX file system, and the information storage unit 301 as text files. In that case, the information providing system of FIG. 20 is capable of making a request to extract a character string, that meets a specific condition, from the text files of the UNIX file system by using a function corresponding to a command on the shell or a "grep" command given from an application program, for example.

Both of the aforementioned information storage equipment 200 and information storage equipment 300 are designed to provide the terminal 100 with digital information in accordance with a certain information providing manner without making a consideration of an output condition (or output conditions) of the terminal 100, wherein the "output condition" represents resolution of a display screen of a display unit corresponding to the output unit 102, for example.

In general, the terminals that provide users with digital information have a variety of configurations, so there are provided a variety of information output conditions. For example, some terminals are equipped with wide screens having high resolution and sound output functions. Other terminals are equipped with small screens having low resolution but are not equipped with sound output functions. The information storage equipment of the aforementioned information providing system is designed to merely provide the terminal with information in accordance with a prescribed manner without making consideration of the aforementioned output conditions. So, the aforementioned information providing systems suffer from problems, which will be described below.

(1) First Problem

In the case where the information storage equipment provides visual information such as texts and pictures in a screen size of 800×600 dots, however, if the terminal is equipped with a display unit whose screen size is 640×480 dots having low resolution, all of the information cannot be stored in such a small screen size. Therefore, the user must manipulate the display to scroll the screen in order to look at all areas of display data.

The paper of Japanese Patent Application, Publication No. Hei 4-280378 discloses technology for display control of information, wherein windows are automatically corrected in position, size and shape in response to variations of display objects. In this technology, however, if size of the display object exceeds the maximum size of the window, it is necessary for the user to manipulate the display to scroll the window. The above paper contains description that if the display object is too large to be stored in the screen, the display object as a whole can be contracted on the screen. However, if the display object is merely contracted, pictures and characters that an information provider considers important are contracted as well.

(2) Second Problem

In the case of the terminal that cannot provide sound output because hardware does not have a sound device such as a speaker, sound information provided from the information storage equipment is not at all utilized, so that the user cannot notice the fact that the sound information is provided. In the case of the terminal whose display unit is capable of displaying texts but is incapable of displaying pictures, picture information provided from the information storage equipment is not at all utilized, so that the user cannot notice the fact that the picture information is provided.

(3) Third Problem

In the case of the terminal, which has hardware corresponding to the display unit such as CRT display, however, which is short of software functions (or software modules) for the MPEG player and the like (where "MPEG" is an abbreviation for "Motion Picture Experts Group"), it is impossible to provide the user with such information.

Some conventional technology is capable of solving the above problem as follows:

When information on the WWW server is downloaded by the WWW browser of the terminal, if the terminal is short of a required output function (or software module), warning message is displayed on the screen to urge the WWW browser of the terminal to add an output function, which is downloaded from some appropriate system.

Even in the above technology, it is necessary for the user to perform all procedures for download manipulation. So, it cannot be said that everyone can perform those procedures. In addition, the above technology is not applicable to a specific kind of terminals (such as "KIOSK terminals", which are located on the platforms of the railway stations, for example) which do not have a capability of performing addition of the output functions in a dialogue manner.

SUMMARY OF THE INVENTION

It is an object of the invention to provide an information providing system which is capable of dynamically changing information providing manners to suit output conditions of terminals while substantially maintaining the information providing manners by which providers intend to provide digital information.

It is another object of the invention to provide an information providing system having a function to cope with shortage of output functions of terminals.

An information providing system of this invention is mainly configured by a terminal and an information storage equipment. The terminal is manipulated by a user to issue an information obtainment request, wherein it has a specific output condition, which is defined by a picture output function and/or a sound output function. The information storage equipment contains a number of information element managers, from which digital information elements are extracted in response to the information obtainment request. The digital information elements are synthesized together into digital information in accordance with a default (information) providing manner, which represents a specific display screen whose screen size and layout are determined in advance. Then, the digital information is transmitted to the terminal, which in turn provides the user with content of the digital information by using pictures and/or sounds. If the default providing manner does not match with the output function of the terminal, the information storage equipment changes the default providing manner by one of change methods, which is selected in consideration of mutual priority set for the information element managers. Thus, the digital information elements are synthesized together into the digital information in accordance with the changed providing manner.

The mutual priority consists of priorities respectively set for a prescribed number of the information element managers from which the digital information elements are extracted. Herein, one of the change methods is selected in such a way that it does not influence the information element manager given a high priority.

To cope with shortage of output functions of the terminal, the information storage equipment holds a resource list describing resources to obtain software modules. Therefore, if the terminal does not have a necessary software module required for outputting the digital information, the terminal downloads it from its resource which is listed on the resource list.

BRIEF DESCRIPTION OF THE DRAWINGS

These and other objects, aspects and embodiment of the present invention will be described in more detail with reference to the following drawing figures, of which:

FIG. 5A and FIG. 5B show contents of rules, which are used for reconstruction of digital information provided for the user;

DESCRIPTION OF THE PREFERRED EMBODIMENT

This invention will be described in further detail by way of examples with reference to the accompanying drawings.

[A] Embodiment 1

Figure 1:
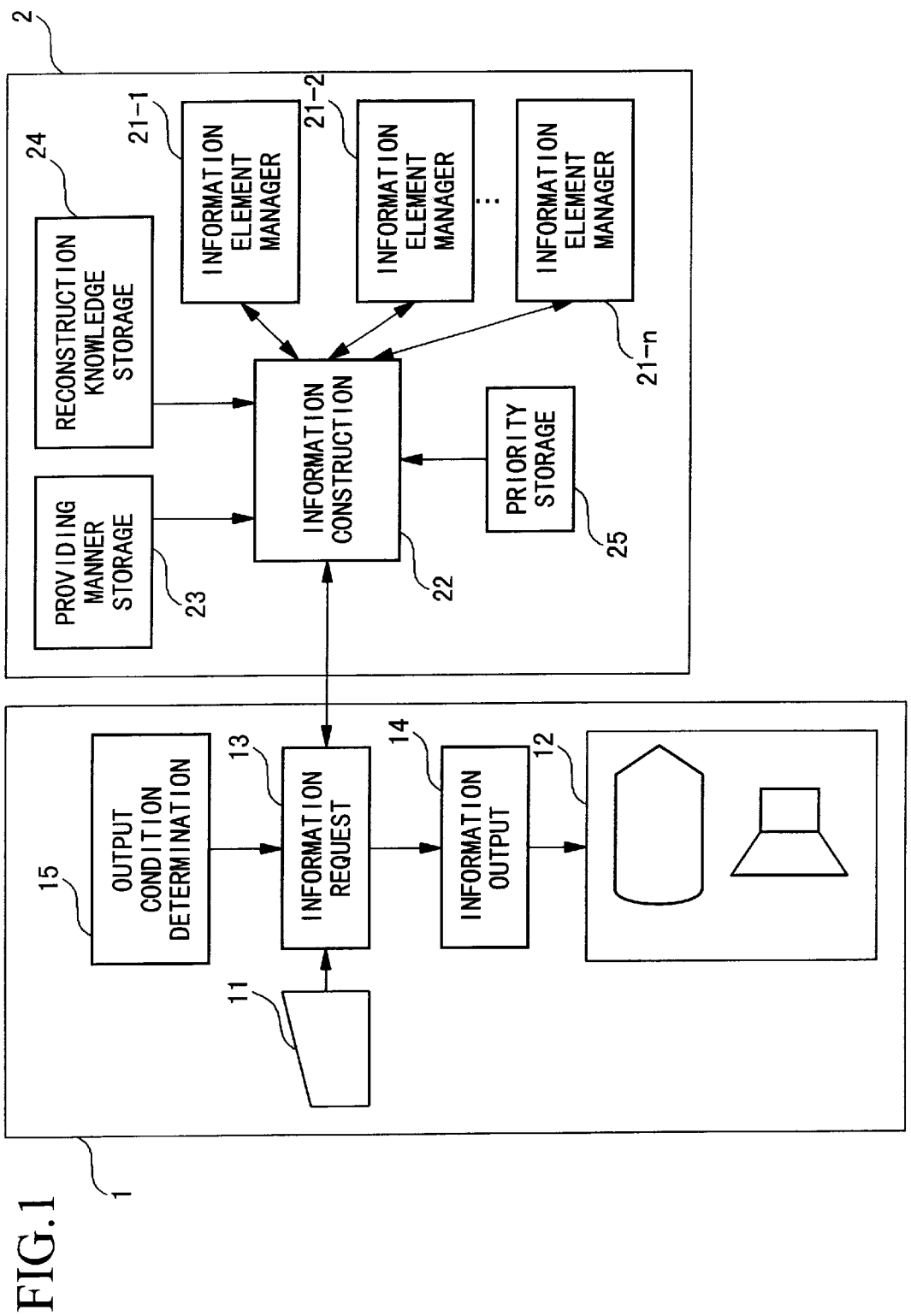
FIG. 1 is a block diagram showing a configuration of an information providing system mainly configured by a terminal and an information storage equipment in accordance with embodiment 1 of the invention.

FIG. 1 is a block diagram showing a configuration of an information providing system in accordance with embodiment 1 of the invention. The information providing system of FIG. 1 is mainly configured by a terminal 1 and an information storage equipment 2, which are connected together to enable mutual communications therebetween. Herein, the terminal 1 is designed to receive a request from a user, so that requested information is output to the user. The information storage equipment 2 retains and manages information that should be provided for the user.

The terminal 1 contains an input unit 11 such as a keyboard and an output unit 12, which contains at least a display unit. In some cases, the output unit 12 further contains a sound unit such as a speaker. In addition, the terminal 1 contains an output condition determination unit 15 for determining output conditions of the output unit 12, an information output unit 14 for outputting information using the output unit 12, and an information request unit 13. The information request unit 13 describes content of requirement of the information that the user requests by means of the input unit 11 by using inquiry languages such as SQL. Or, it describes messages to open files. Or, it describes messages to display contents of specific pages of a book, which is designated by the user. Thus, the information request unit 13 supplies the information storage equipment 2 with contents of the above description together with the output conditions determined by the output condition determination unit 15. Then, the information request unit 13 sends digital information, which is given from the information storage equipment 2, to the information output unit 14.

The information storage equipment 2 contains multiple information element managers 21-1 to 21-n, each of which retains and manages each of digital information elements constructing digital information. In addition, the information storage equipment 2 contains an information construction unit 22, a providing manner storage unit 23, a reconstruction knowledge storage unit 24 and a priority storage unit 25. The digital information elements are respectively extracted from the information element managers 21-1 to 21-n and are synthesized together to construct the digital information. Herein, the digital information is provided for the user in accordance with a default providing manner, which is stored in the providing manner storage unit 23. The reconstruction knowledge storage unit 24 stores multiple methods for changing the default providing manner in response to the output condition of the terminal 1. The priority storage unit 25 stores mutual priority, which is set to define a relationship between the information element managers 21-1 to 21-n. The information construction unit 22 extracts digital information elements suited to a request given from the terminal 1 from the information element managers 21-1 to 21-n. If the output condition of the terminal 1 matches with the default providing manner stored in the providing manner storage unit 23, the information construction unit 22 synthesizes the digital information elements to construct digital information in accordance with the default providing manner, so that the digital information is transmitted to the terminal 1 that issued the request. On the other hand, if the output condition does not match with the default providing manner, the information construction unit 22 determines a method, selected from among the multiple methods stored in the reconstruction knowledge storage unit 24, in consideration of the mutual priority which is set for the information element managers 21-1 to 21-n and are stored in the priority storage unit 25. Using such a method, the default providing manner is changed. So, the information construction unit 22 synthesizes the digital information elements to construct the digital information in accordance with the changed providing manner, so that the digital information is transmitted to the terminal 1 that issued the request.

Figures 2, 3:
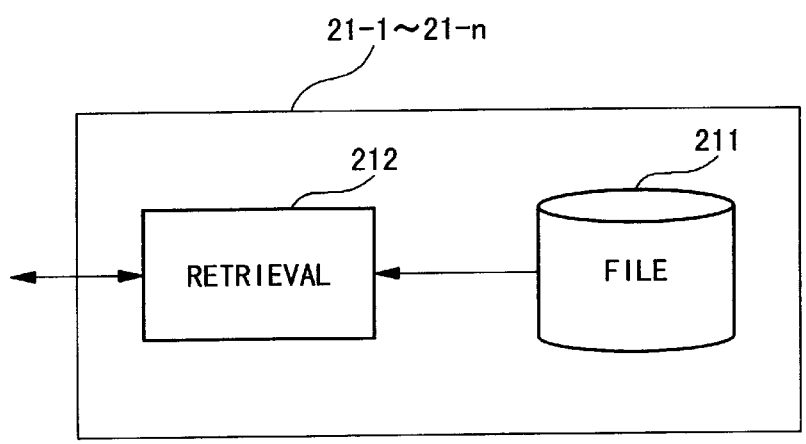
FIG. 2 shows examples of output functions whose contents are determined by an output condition of the terminal.
FIG. 3 is a block diagram showing an example of a configuration used for each of information element managers contained in the information storage equipment shown in FIG. 1.

FIG. 2 shows examples of the output conditions that is determined by the output condition determination unit 15. There are provided three output functions, which correspond to "display screen resolution" represented by "DISPLAY_resolution", "picture output function" represented by "DISPLAY_picture" and "sound output function" represented by "SOUND". Herein, the display screen resolution is defined by two parameters, i.e., a number of pixels in X-axis direction (Xpixel) and a number of pixels in Y-axis direction (Ypixel). In addition, each of the picture output function and sound output function is defined by two parameters regarding possibility, which are represented by "ABLE" and "DISABLE". Parameter values representing values that the terminal 1 is capable of actually employing are shown with respect to the three output functions respectively. Among the output functions of the output condition, for example, the output condition determination unit 15 is capable of obtaining the display screen resolution, which is managed by the operating system of the terminal 1, by sending an inquiry to the operating system. Incidentally, a manager of the terminal 1 sets the output function(s), which is difficult to obtain automatically on the output condition determination unit 15 in advance. The display screen resolution is considered as one that corresponds to an overall size of the display screen of the terminal 1. However, if a window of the display of the terminal 1 is assigned to a task to provide information, the display screen resolution is set with respect to such a window. If the window for providing the information changes in size, the output condition determination unit 15 produces display screen resolution in response to a newest size of the window.

FIG. 3 is a block diagram showing an example of a configuration for each of the information element managers 21-1 to 21-n. The information element manager of FIG. 3 is configured by a file 211 for retaining digital information and a retrieval unit 212. The retrieval unit 212 searches through the file 211 to retrieve information which is requested by the information construction unit 22. The following description is made based on a precondition that there are provided three information element managers, which are designated by reference symbols 21-1, 21-2 and 21-3 respectively. Herein, the information element managers are provided to cope with different functions or different roles. For example, the information element manager 21-1 stores a menu, the information element manager 21-2 stores content, and the information element manager 21-3 stores advertisement. Other than the above, it is possible to provide different media, such as the text, picture and sound, for the information element managers. Or, it is possible to provide the information element managers in response to authors respectively.

Figure 4:
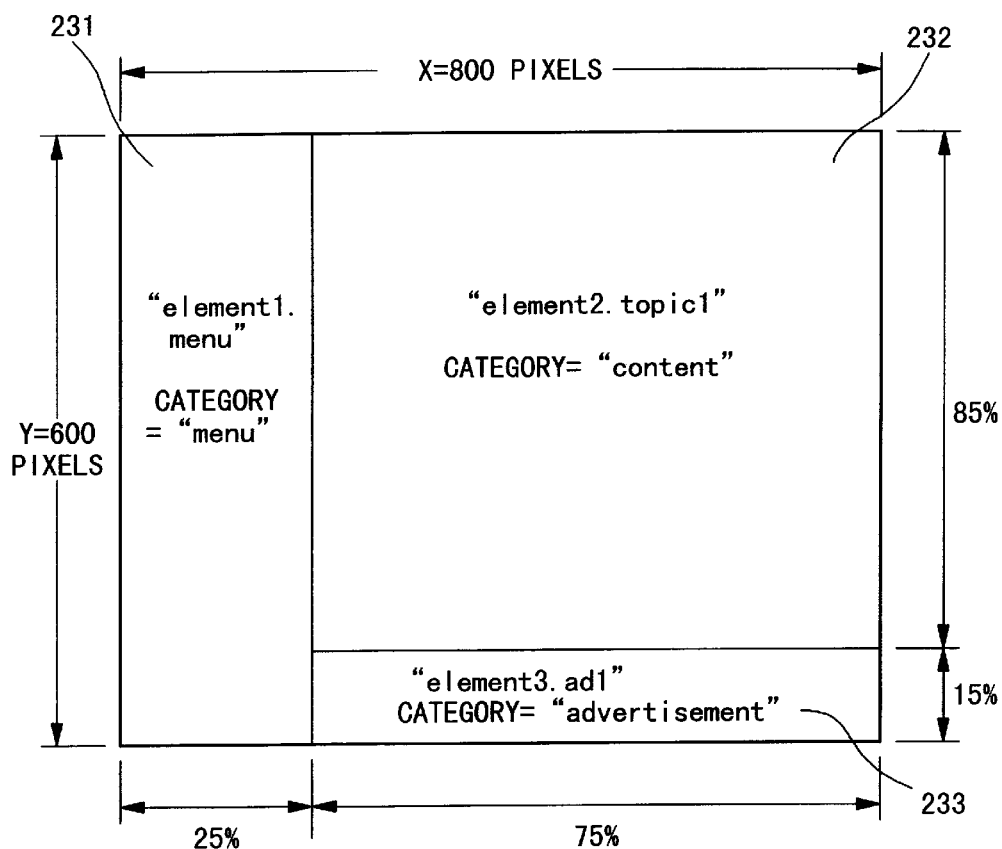
FIG. 4 shows an example of a display screen, which is used to explain about a default providing manner, by which digital information elements are synthesized and are provided for a user.

FIG. 4 is provided to explain about the default providing manner stored in the providing manner storage unit 23. That is, FIG. 4 shows an example of content of a display screen providing default information (hereinafter, simply referred to as default information providing screen). In this example, the default information providing screen consists of 800×600 pixels, wherein a number of X-axis pixels is "800" while a number of Y-axis pixels is "600".

An overall area of the default information providing screen is split by a ratio of 25% to 75% in the X-axis direction (i.e., frame width direction), so that a left-side area 231 and a right-side area are provided. The right-side area is further split by a ratio of 85% to 15% in the Y-axis direction (i.e., frame height direction), so that an upside area 232 and a downside area 233 are provided. The content of the information element manager 21-1, which is represented by "element1.menu" CATEGORY="menu", is arranged on the left-side area 231. In addition, the content of the information element manager 21-2, which is represented by "element2.topic1" CATEGORY= "content", is arranged on the upside area 232, while the content of the information element manager 21-3, which is represented by "element2.ad1" CATEGORY="advertisement", is arranged on the downside area 233. For convenience'sake, FIG. 4 shows an example of default information by using figures, however, the default information is actually described in the text format.

FIG. 5A and FIG. 5B show examples of rules that are stored in the reconstruction knowledge storage unit 24. The present embodiment uses the rules having conditions and conclusions. Herein, change methods are described as the conclusions of the rules. Rule 1 (see FIG. 5A) describes applicability of change methods 11 and 12 if the terminal 1 has a number of X-axis pixels (client.disp.Xpixel) which is smaller than a "default" number of X-axis pixels (default.disp.Xpixel). Herein, the change method 11 designates a change of a menu display manner of the information element manager 21-1 (element1) from a normally displayed manner to a pop-up manner. The change method 12 designates a change of the default number of X-axis pixels to match with the number of X-axis pixels of the terminal 1. A decision as to which of the change methods 11 and 11 is to be firstly employed depends on the content of the priority storage unit 25.

Rule 2 (see FIG. 5B) describes applicability of change methods 21, 22 and 23 if the terminal 1 has a number of Y-axis pixels (client.disp.Ypixel) which is smaller than a "default" number of Y-axis pixels (default.disp.Ypixel). Herein, the change method 21 designates a change of an advertisement display manner of the information element manager 21-3 (element3) from a normally displayed manner to a temporary display manner that the advertisement is temporarily displayed before display of the content. The change method 22 designates a change of the menu display manner, which is identical to that of the aforementioned change method 11. The change method 23 designates a change of the default number of Y-axis pixels to match with the number of Y-axis pixels of the terminal 1. A decision as to which of the change methods 21, 22 and 23 is to be firstly employed depends on the content of the priority storage unit 25.

Figure 6:
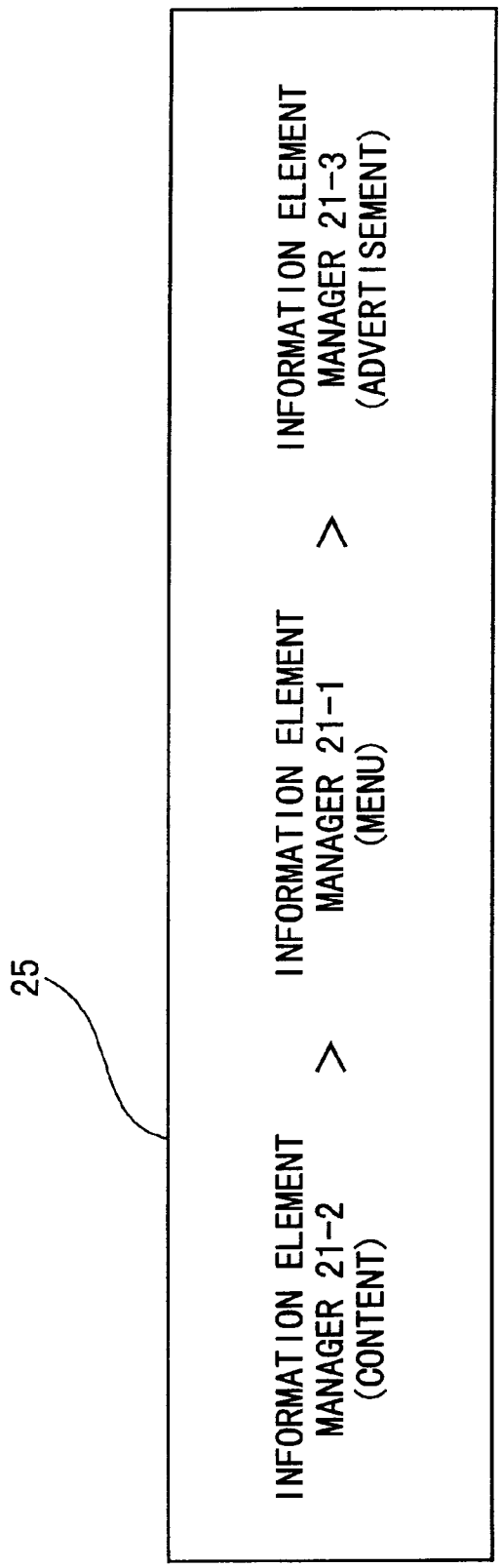
FIG. 6 shows an example of a relationship between information element managers in accordance with mutual priority.

FIG. 6 shows an example of mutual priority that is stored in the priority storage unit 25. In this example, the information element managers are considered as objects given priorities. Herein, the information element manager 21-2 for storing the content is given a highest priority, while the information element manager 21-1 for storing the menu is given a second high priority. In addition, the information element manager 21-3 is given a lowest priority. Incidentally, such mutual priority is not necessarily set for all of the information element managers.

Figure 7:
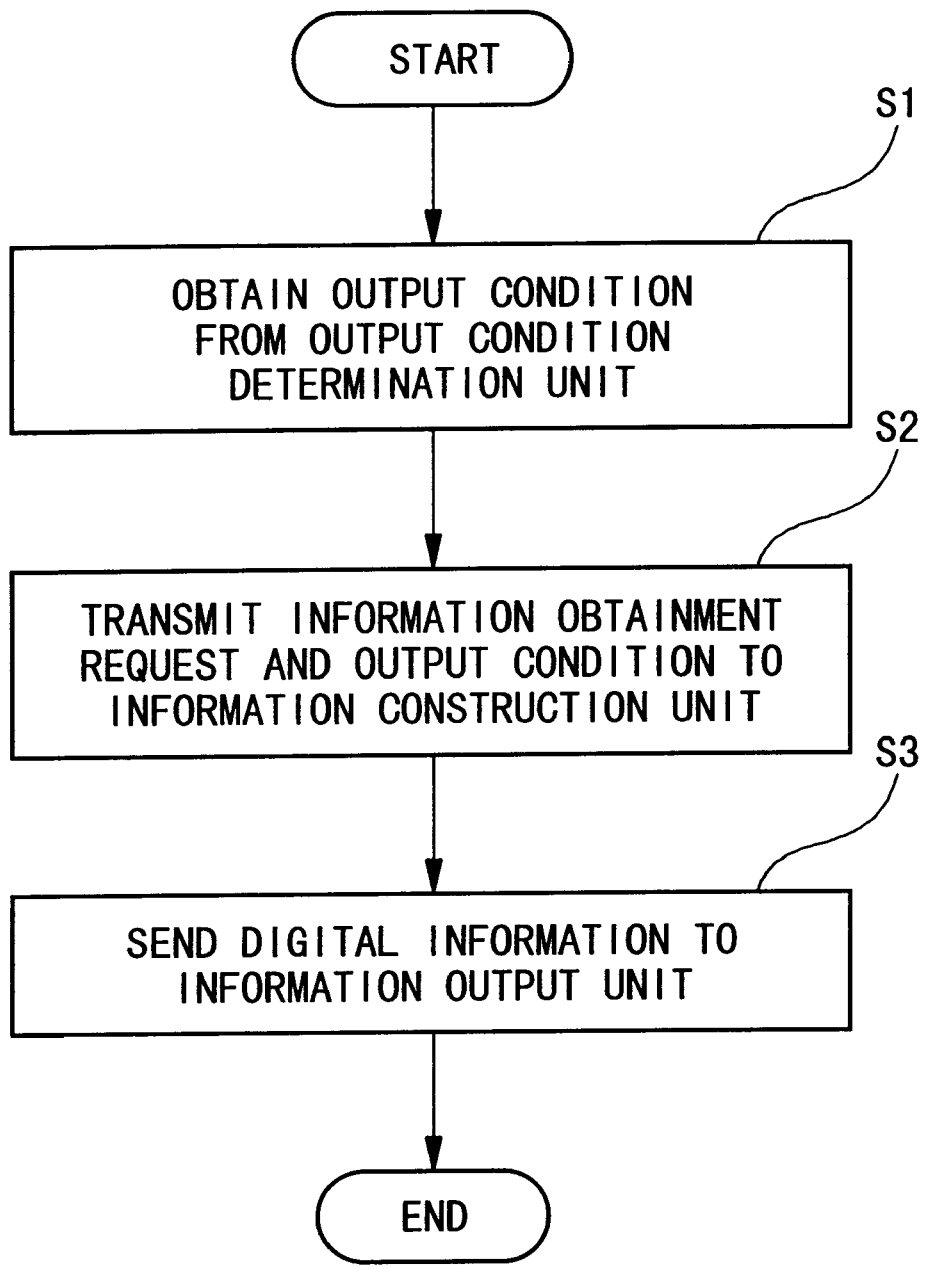
FIG. 7 is a flowchart showing an example of processing of an information request unit of the terminal shown in FIG. 1.
Figure 8A:
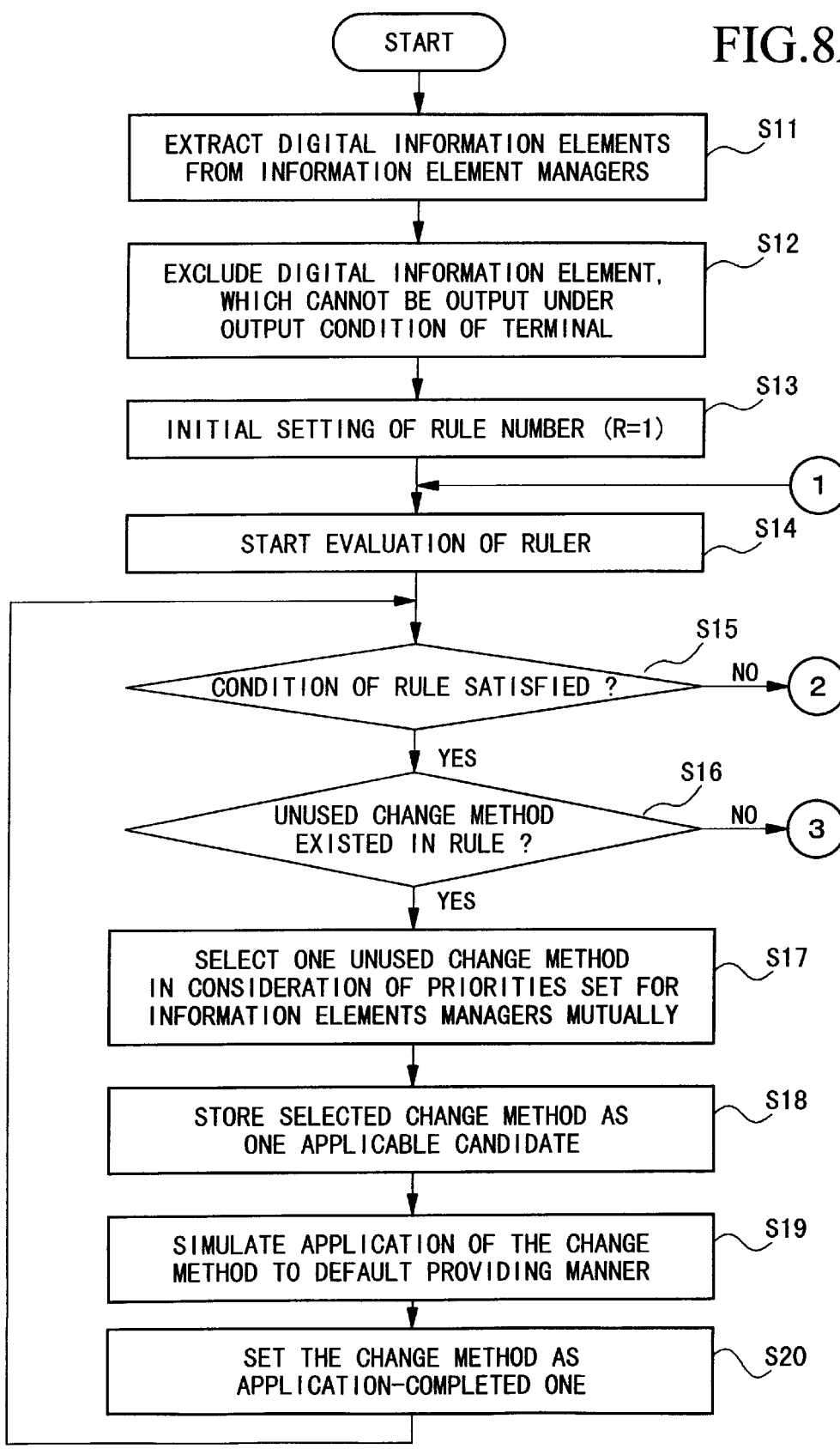
FIG. 8A and FIG. 8B are flowcharts showing an example of processing of an information construction unit of the information storage equipment shown in FIG. 1
Figure 8B:
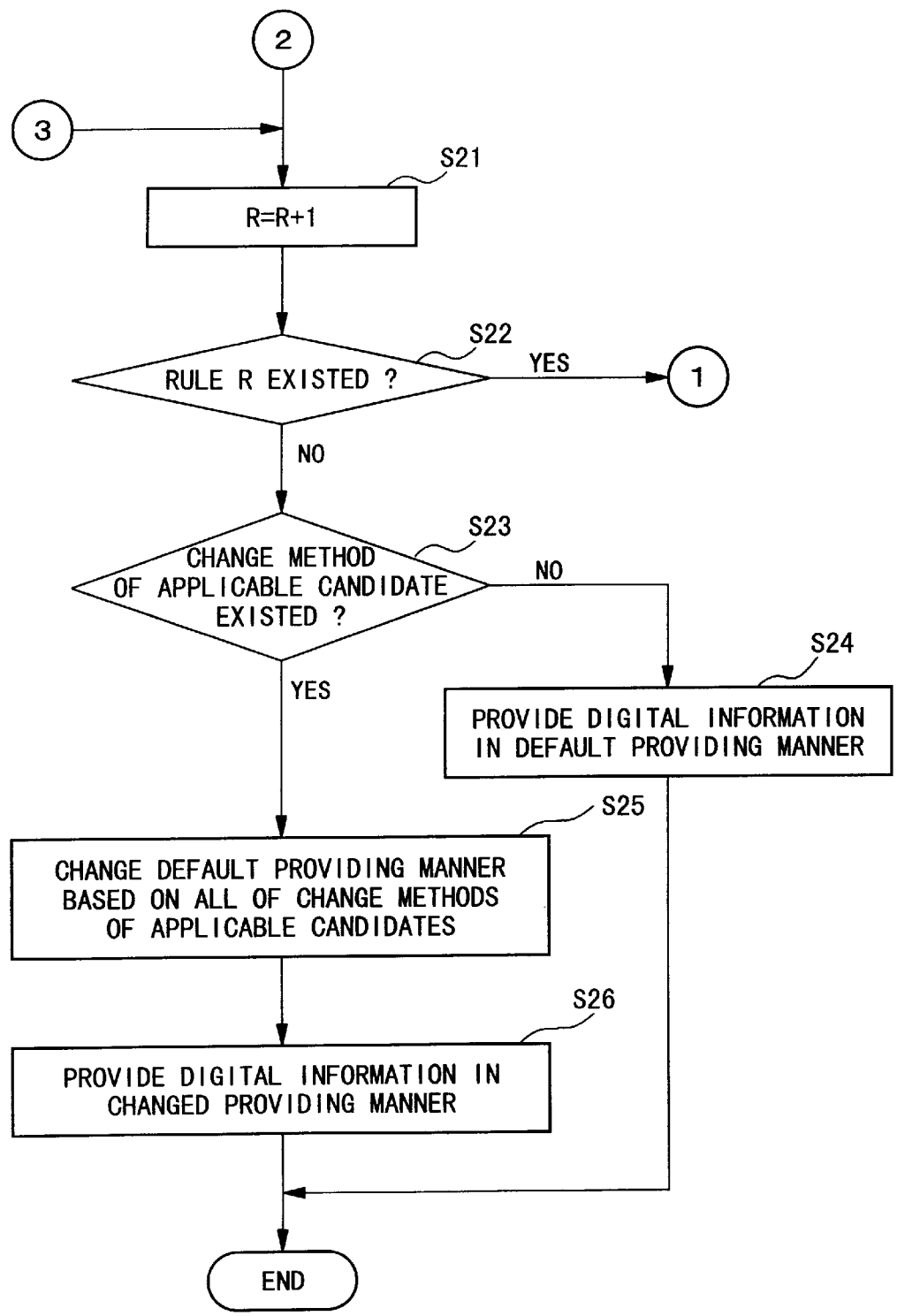

FIG. 7 is a flowchart showing an example of processing which is executed by the information request unit 13 when the information request unit 13 receives an information obtainment request from the user by means of the input unit 11. FIG. 8A and FIG. 8B are flowcharts showing an example of processing which is executed by the information construction unit 22 when the information construction unit 22 receives the information obtainment request from the information request unit 13.

With reference to FIG. 7, FIG. 8A and FIG. 8B, a description will be given with respect to operation of the present embodiment.

When the user of the terminal 1 manipulates the input unit 1 to input an information obtainment request while designating a name of an information service that the user wishes to use, the information request unit 13 starts the processing thereof, which is shown in FIG. 7. In step S1, the information request unit 13 requests the output condition determination unit 15 to provide an output condition of the terminal 1, so that it obtains the output condition which is shown in FIG. 2, for example. In step S2, the information request unit 13 transmits the aforementioned output condition together with the content of the information obtainment request, which the user inputs, to the information construction unit 22.

When receiving the information obtainment request from the terminal 1, the information construction unit 22 starts the processing thereof, which is shown in FIG. 8A and FIG. 8B. In step S11 (see FIG. 8A), the information construction unit 22 extracts digital information elements from the information element managers 21-1 to 21-3 respectively, wherein those digital information elements are required to provide the user with the service that the user requests. Namely, the information construction unit 22 designates the name of the information service and instructs the retrieval unit 212 (see FIG. 3) of the information element manager 21-1 to retrieve a menu of the information service. Herein, the retrieval unit 212 searches through the file 211 to retrieve the menu. In addition, the information construction unit 22 instructs the retrieval unit 212 of the information element manager 21-2 to retrieve content of the information service. Herein, the retrieval unit 212 searches through the file 211 to retrieve the content of the information service. Further, the information construction unit 22 instructs the retrieval unit 212 of the information element manager 21-3 to retrieve an advertisement regarding the information service. Herein, the retrieval unit 212 searches through the file 211 to retrieve the advertisement of the information service.

Next, the information construction unit 22 transfers control to step S12. Herein, the information construction unit 22 analyzes the output condition, which is communicated thereto from the terminal 1. The aforementioned digital information elements, which are obtained by the aforementioned step S11, may contain an unnecessary digital information element (or unnecessary digital information elements), which cannot be output under the output condition of the terminal 1. So, the information construction unit 22 excludes it (or them) from the digital information elements obtained by the step S11. In the aforementioned example of the output condition shown in FIG. 2, the sound output function is made "disable". So, the information construction unit 22 excludes the digital information element(s) regarding the sound. By the way, the output condition of FIG. 2 describes that the picture output function is made "able". However, if the picture output function is made "disable", the information construction unit 22 excludes the digital information element regarding the picture.

Next, the information construction unit 22 proceeds with steps S13 to S23 and S25. That is, the information construction unit 22 uses knowledge stored in the reconstruction knowledge storage unit 24 to make a decision as to whether the output condition of the terminal 1 matches with the default providing manner stored in the providing manner storage unit 23 or not. If the output condition does not match with the default providing manner, the information construction unit 22 performs change processes for changing the default providing manner. Details of the above processes will be described below.

In step S13, a rule number "R" is subjected to initial setting, wherein it is set at "1". In step S14, the information construction unit 22 starts evaluation on the rule 1 stored in the reconstruction knowledge storage unit 24. With reference to FIG. 5A, the rule 1 describes the condition thereof, as follows:

"A number of X-axis pixels (client.disp.Xpixel) of the terminal is smaller than the "default" number of X-axis pixels (default.disp.Xpixel)."

So, the number of X-axis pixels (Xpixel), which is listed with respect to the display screen resolution in FIG. 2 and which is communicated from the terminal 1, is compared with the default number of X-axis pixels (default Xpixel, see FIG. 4) stored in the providing manner storage unit 23. By such a comparison, the information construction unit 22 makes a decision as to whether the condition of the rule 1 stands effectively or not in step S15. In the present example, the number of X-axis pixels of the terminal 1 is "640", while the default number of X-axis pixels is "800". Therefore, it can be said that the aforementioned condition of the rule 1 stands effectively.

In steps S16 and S17, the information construction unit 22 selects one of the change methods 11 and 12 set for the rule 1 in consideration of mutual priority stored in the priority storage unit 25. FIG. 6 shows that the information element manager 21-2 is given a highest priority, the information element manager 21-1 is given a second high priority, while the information element manager 21-3 is given a lowest priority. FIG. 5A shows that the change method 11 changes the menu, which is the content of the information element manager 21-1, to a pop-up menu. Therefore, the change method 11 influences only the providing manner of the information element mangers 21-1. On the other hand, the change method 12 changes the number of X-axis pixels on the information providing screen to match with the number of X-axis pixels of the terminal 1. Therefore, the change method 12 influences all of the information providing manners of the information element managers 21-1, 21-2 and 21-3. For this reason, the information construction unit 22 selects the change method 11, which does not influence the information element manager 21-2 given the highest priority.

In step S18, the information construction unit 22 saves the selected change method as one applicable candidate. In step S19, the information construction unit 22 simulates application of the change method 11 to the default providing manner. That is, after the menu corresponding to the content of the information element manager 21-1 is changed to the pop-up menu on the default information providing screen shown in FIG. 4, the information construction unit 22 produces a number of X-axis pixels and a number of Y-axis pixels on the default information providing screen. Herein, the number of X-axis pixels is calculated by 800×75%=600, while the number of Y-axis pixels is unchanged, i.e., "600". In step S20, the change method 11 that is presently applied is set as application-completed one. Thereafter, the information construction unit 22 reverts control to step S15, so that evaluation is performed again on the condition of the rule 1. In this case, the aforementioned change method 11 has already changed the number of X-axis pixels to "600" on the default information providing screen. For this reason, the condition of the rule 1 does not at all stand. Therefore, the information construction unit 22 ends the evaluation of the rule 1 at this timing. Incidentally, the evaluation of the rule 1 can be completed when all of the change methods of the rule 1 are completely set as applicable candidates.

Next, in step S21 (see FIG. 5B), the information construction unit 22 increases the rule number R by "+1". Thus, the information construction unit 22 starts evaluation on the rule 2. FIG. 5B shows that the condition of the rule 2 describes as follows:

"A number of Y-axis pixels (client.disp.Ypixel) of the terminal is smaller than a default number of Y-axis pixels (default.disp.Ypixel)."

Thus, the number of Y-axis pixels (Ypixel), which is listed with respect to the display screen resolution in FIG. 2 and which is communicated from the terminal 1, is compared with the default number of Y-axis pixels (default Ypixel, see FIG. 4) stored in the providing manner storage unit 23. By such a comparison, the information construction unit 22 makes a decision as to whether the condition of the rule 2 stands effectively or not in step S15. In the present example, the number of Y-axis pixels of the terminal 1 is "480", while the default number of Y-axis pixels is "600". Thus, it can be said that the condition of the rule 2 stands effectively.

In steps S16 and S17, the information construction unit 22 selects one of the change methods 21, 22 and 23 in consideration of the mutual priority stored in the priority storage unit 25. As described before with reference to FIG. 6, the information element manager 21-2 is given the highest priority, the information element manager 21-1 is given the second high priority, and the information element manager 21-3 is given the lowest priority. The change method 21 changes the display manner of the advertisement, corresponding to the content of the information element manager 21-3, from the normally displayed manner to the temporary display manner. So, the change method 21 influences only the information providing manner of the information element manager 21-3. The change method 22 changes the menu, corresponding to the content of the information element manager 21-1, to the pop-up menu. Therefore, the change method 22 influences only the information providing manner of the information element manager 21-1. The change method 23 changes the number of Y-axis pixels on the information providing screen to conincide with the number of Y-axis pixels of the terminal 1. Therefore, the change method 23 influences all of the information providing manners of the information element managers 21-1, 21-2 and 21-3. For this reason, the information construction unit 22 selects the change method 21, which does not influence information providing manners of the information element managers 21-1 and 21-2 whose priorities are relatively high.

In step S18, the information construction unit 22 saves the selected change method 21 as one applicable candidate. In step S19, the information construction unit 22 simulates application of the change method 21 to the default providing manner. That is, the information construction unit 22 produces a number of X-axis pixels and a number of Y-axis pixels on the default information providing screen (see FIG. 4) with respect to the case where the change method 21 changes a display manner of the advertisement, corresponding to the content of the information element manager 21-3, to another display manner. Herein, the number of X-axis pixels is unchanged (i.e., "600"), while the number of Y-axis pixels is changed by 600×85%=510. Then, the information construction unit 22 sets the change method 21 presently applied as application-completed one in step S20. Thereafter, the information construction unit 22 reverts control to step S15, so that evaluation is performed again on the condition of the rule 2. In this case, the aforementioned change method 21 changed the number of X-axis pixels to "510"on the default information providing screen. However, the number of Y-axis pixels of the terminal 1 is "480", which still meets the aforementioned condition of the rule 1.

Thus, the information construction unit 22 further selects one of the unused change methods 22 and 23 suited to the rule 2 in consideration of the mutual priority stored in the priority storage unit 25 in steps S16 and S17. In this case, the information construction unit 22 selects the change method 22, while the change method 11 whose content is identical to that of the change method 22 has been already set as the applicable candidate. Therefore, the information construction unit 22 selects the remaining change method 23. In step S18, the selected change method 23 is set as an applicable candidate. In step S19, the information construction unit 22 simulates application of the change method 23 to the default providing manner. Thus, it calculates a number of Y-axis pixels on the default information providing screen. Herein, the calculated number is "480", which coincides with the number of Y-axis pixels of the terminal 1. Then, the information construction unit 22 sets the change method 23 presently applied as application-completed one in step S20. Thereafter, the information construction unit 22 reverts control to step S15, so that evaluation is performed again on the condition of the rule 2. In this case, the condition of the rule 2 does not stand. Thus, evaluation of the rule 2 is ended.

Afterwards, the information construction unit 22 increases the rule number R by "+1", so that it proceeds with evaluation of a rule 3. The present embodiment provides only two rules, i.e., the rules 1 and 2 shown in FIG. 5A and FIG. 5B, so it completes evaluation of the rules at step S22.

In step S23, the information construction unit 22 makes a decision as to whether the change method that is set as the applicable candidate still exists or not. If there exists no change method that is set as the applicable candidate, it can be said that the output condition of the terminal 1 matches with the default providing manner. So, the information construction unit 22 synthesizes digital information elements to construct digital information in accordance with the default providing manner, so that in step S24, the digital information, which should be provided for the user, is transmitted to the terminal 1 that issued the request.

On the other hand, if there exists at least one change method that is set as the applicable candidate, the information construction unit 22 transfers control to step S25. In step S25, the default providing manner is changed on the basis of all of the change methods that are set as the applicable candidates. In the aforementioned example, three change methods, i.e., the change methods 11, 21 and 23, are set as the applicable candidates. Therefore, the information construction unit 22 applies the change method 11 to the default providing manner shown in FIG. 4 so as to change the display manner of the menu to the pop-up display manner. In addition, it applies the change method 21 to the default providing manner to change the display manner of the advertisement to the temporary display manner. Further, it applies the change method 23 to the default providing manner to reduce the number of Y-axis pixels to "480" on the information providing screen. Then, the information construction unit 22 transfers control to step S26. Herein, the information construction unit 22 synthesizes the digital information elements to construct the digital information in accordance with the changed providing manner that is described above. So, the digital information, which should be provided for the user, are transmitted to the terminal 1 that issued the request.

Thus, the information construction unit 22 completes the processing thereof with respect to the information obtainment request that the terminal 1 presently issues.

When receiving the digital information from the information construction unit 22, the information request unit 13 of the terminal 1 forwards it to the information output unit 14 in step S3 shown in FIG. 7. The information output unit 14 outputs the digital information to the output unit 12, from which it is provided for the user.

Figure 9:
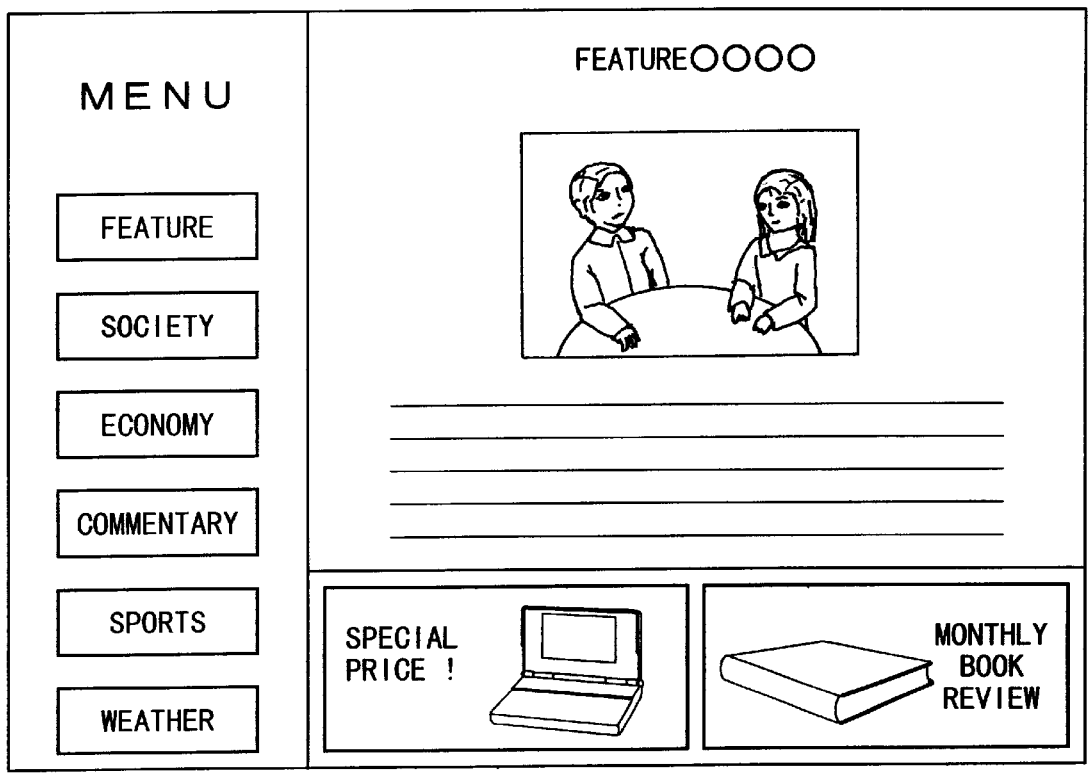
FIG. 9 shows an example of pictures displayed on the display screen in accordance with the default providing manner.
Figure 10:
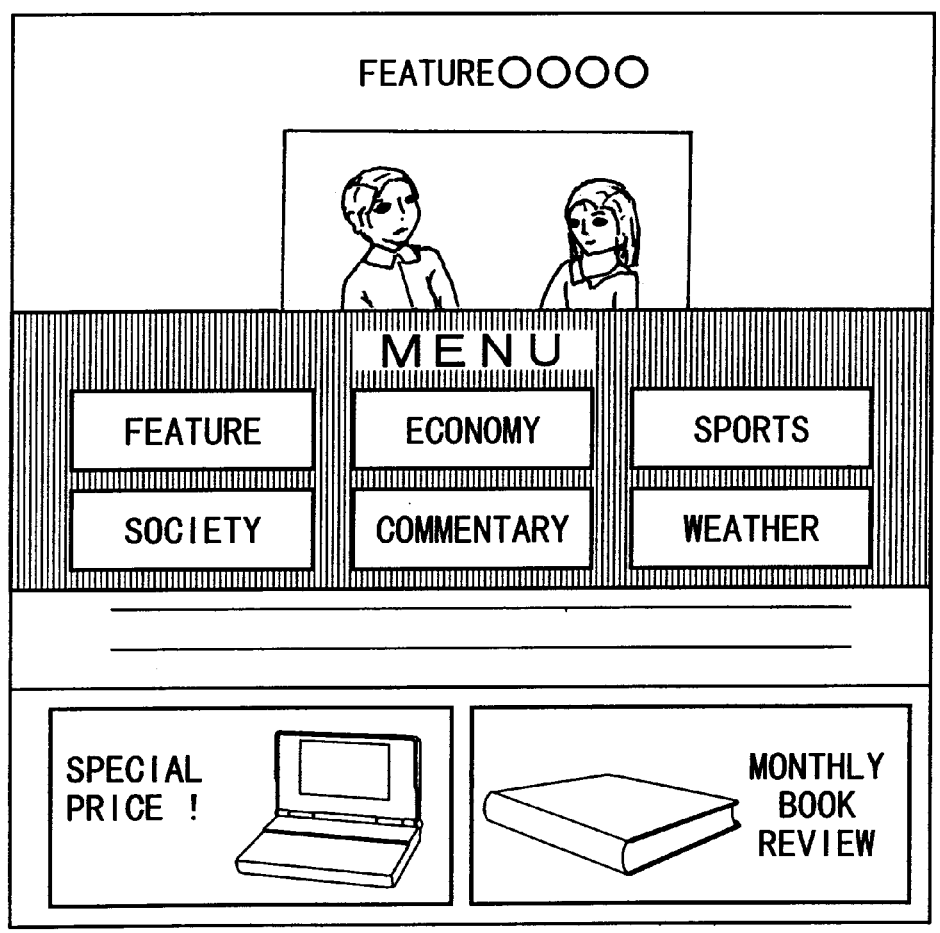
FIG. 10 shows an example of pictures, which are displayed on the display screen in accordance with a certain information providing manner that is changed as compared with the default providing manner.

FIG. 9, FIG. 10, FIG. 11A, FIG. 11B and FIG. 11C show different information providing manners, which are actualized on the display screen. Herein, the information providing manner of FIG. 9 coincides with the foregoing default providing manner, which is stored in the- providing manner storage unit 23. FIG. 9 shows an example of pictures of the display screen, which provides the user with the digital information in accordance with the default providing manner, wherein the menu, content and advertisement are displayed on one screen. FIG. 10 shows an example of the information providing manner to which only the change method 11 is applied. Herein, the menu is displayed in the pop-up display manner, while the advertisement is displayed in the normally displayed manner.

Figure 11A:
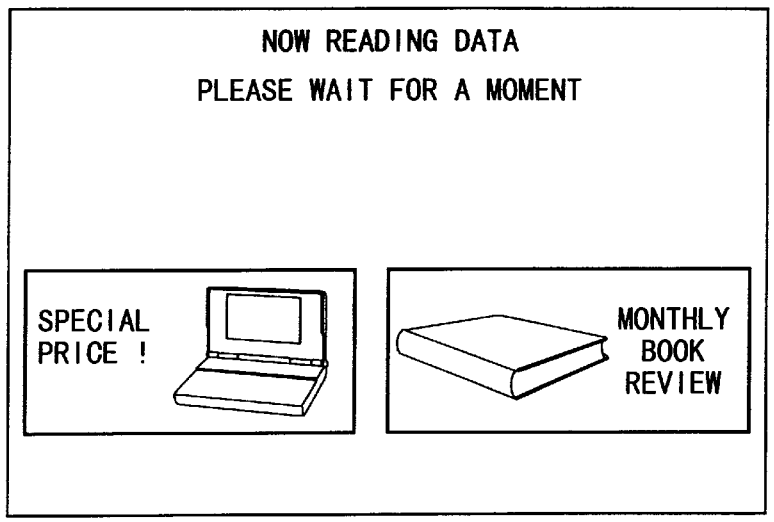
FIG. 11A, FIG. 11B and FIG. 11C show examples of pictures, which are displayed on the display screen in accordance with different information providing manners respectively.
Figure 11B:
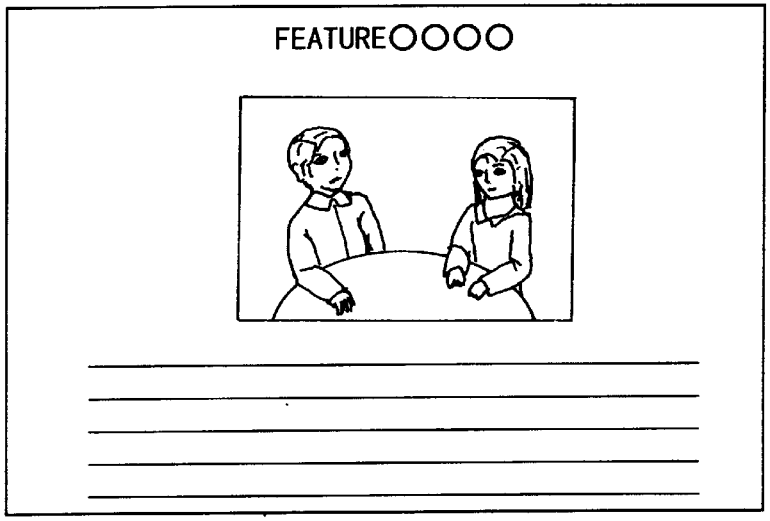
Figure 11C:
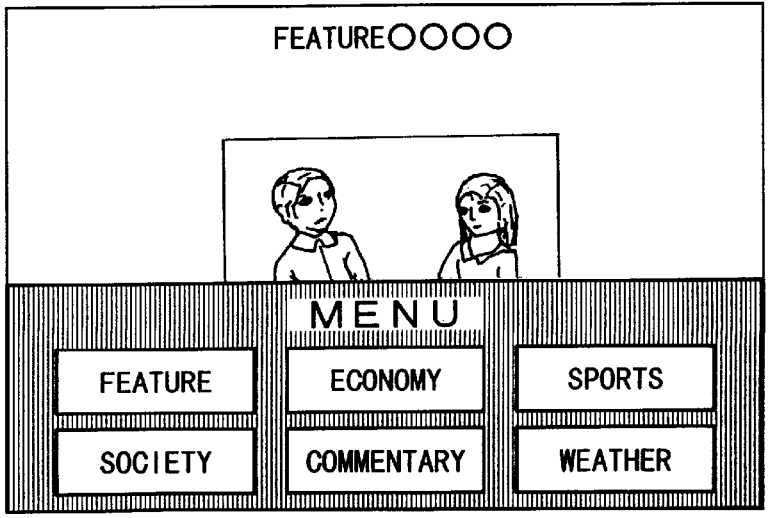

FIG. 11A, FIG. 11B and FIG. 11C show examples of pictures of the display screen whose information providing manner is changed by the change methods 11, 21 and 23, so that multiple sets of digital information are provided for the user in accordance with the changed providing manners respectively. At first, pictures of FIG. 11A appear on the display screen, wherein display of the advertisement is performed prior to display of the content. Then, pictures of FIG. 11B appear on the display screen, which now employs the pop-up display manner for the menu. So, the menu is displayed as shown in FIG. 11C only when the user requests to display the menu. Herein, the pop-up menu is displayed being partially overlapped with a content display area that displays the content. Such a content display area (see FIG. 11B) has specific display screen resolution, according to which the number of X-axis pixels is "600" while the number of Y-axis pixels is "480", for example. As compared with a default content area (see 232 in FIG. 4) where the number of X-axis pixels is "480" while the number of Y-axis pixels is "510", the above content display area is reduced in number of Y-axis pixels. That is, the content of the content display area is somewhat compressed (or contracted) in the Y-axis direction. Such compression of the content is effected by the information construction unit 22. As for the compression of the content, it is possible to employ two methods, as follows:

(1) First method that performs compression uniformly, regardless of types of media (such as characters and pictures) of the content.

Figure 12A:
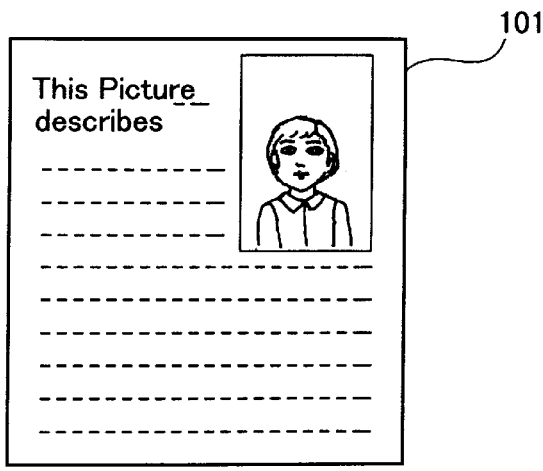
FIG. 12A shows an example of an image displayed on a display screen in accordance with a default providing manner.
Figure 12B:
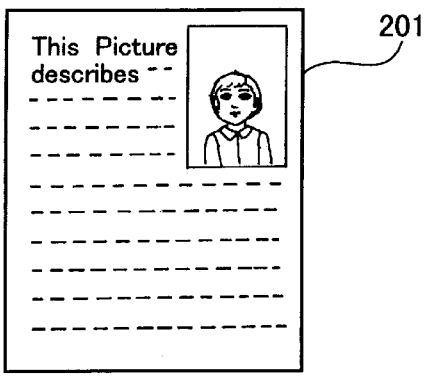
FIG. 12B, FIG. 12C and FIG. 12D show examples of compressed images, which are compressed as compared with the image of FIG. 12A by different compression manners respectively.

For example, an overall area of the content, which is originally displayed using a default display size of FIG. 12A, is uniformly contracted in reduced display size of FIG. 12B.

(2) Second method, wherein priorities are set in advance with respect to types of media, so that a compression rate is increased with respect to media given low priority while a compression rate is decreased or compression is not performed with respect to media given high priority.

Figure 12C:
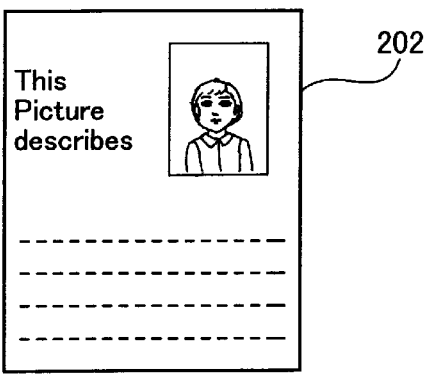
Figure 12D:
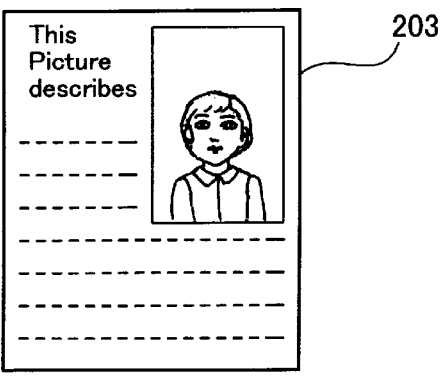

Suppose that priority set to characters is higher than priority set to pictures. In this case, only the picture of the content are contracted as shown in FIG. 12C, wherein the characters are displayed in their original sizes. In contrast, if the priority of the picture is higher than the priority of the characters, the characters are contracted while the picture is displayed in its original size. The aforementioned priorities set for the types of the media are stored in the priority storage unit 25.

By the way, the user who is provided with the information using the aforementioned display screen (see FIG. 9, FIG. 10, FIG. 11A, FIG. 11B and FIG. 11C) is capable of selecting a certain item listed on the menu. In that case, the information request unit 13 of the terminal 1 transmits an information obtainment request regarding information of the selected item to the information storage equipment 2. Herein, the output condition of the terminal 1 can be transmitted to the information storage equipment 2 every time the information obtainment request is made. Or, the information construction unit 22 is capable of repeatedly using the output condition, which the terminal 1 firstly transmits. To cope with the above information obtainment request, the information storage equipment 2 performs processing, which is similar to the aforementioned processing. Thus, the information storage equipment 2 transmits digital information regarding the selected (or requested) item to the terminal 1. In the present embodiment as shown in FIG. 6, the priority storage unit 25 stores only one kind of the mutual priority. Therefore, the information storage equipment 2 refers to such mutual priority in order to change the default providing manner, according to which digital information elements are synthesized together to construct digital information with regard to the requested item. Incidentally, it is possible to store multiple sets of the mutual priorities in the priority storage unit 25. In that case, it is possible to change over the mutual priority with respect to each of items which are selected, so that the changed mutual priority is referred to change the default providing manner. In order to provide digital information corresponding to contents of books in which data are arranged on pages, it is possible to change over the priority every page of the book.

[B] Embodiment 2

Figure 13:
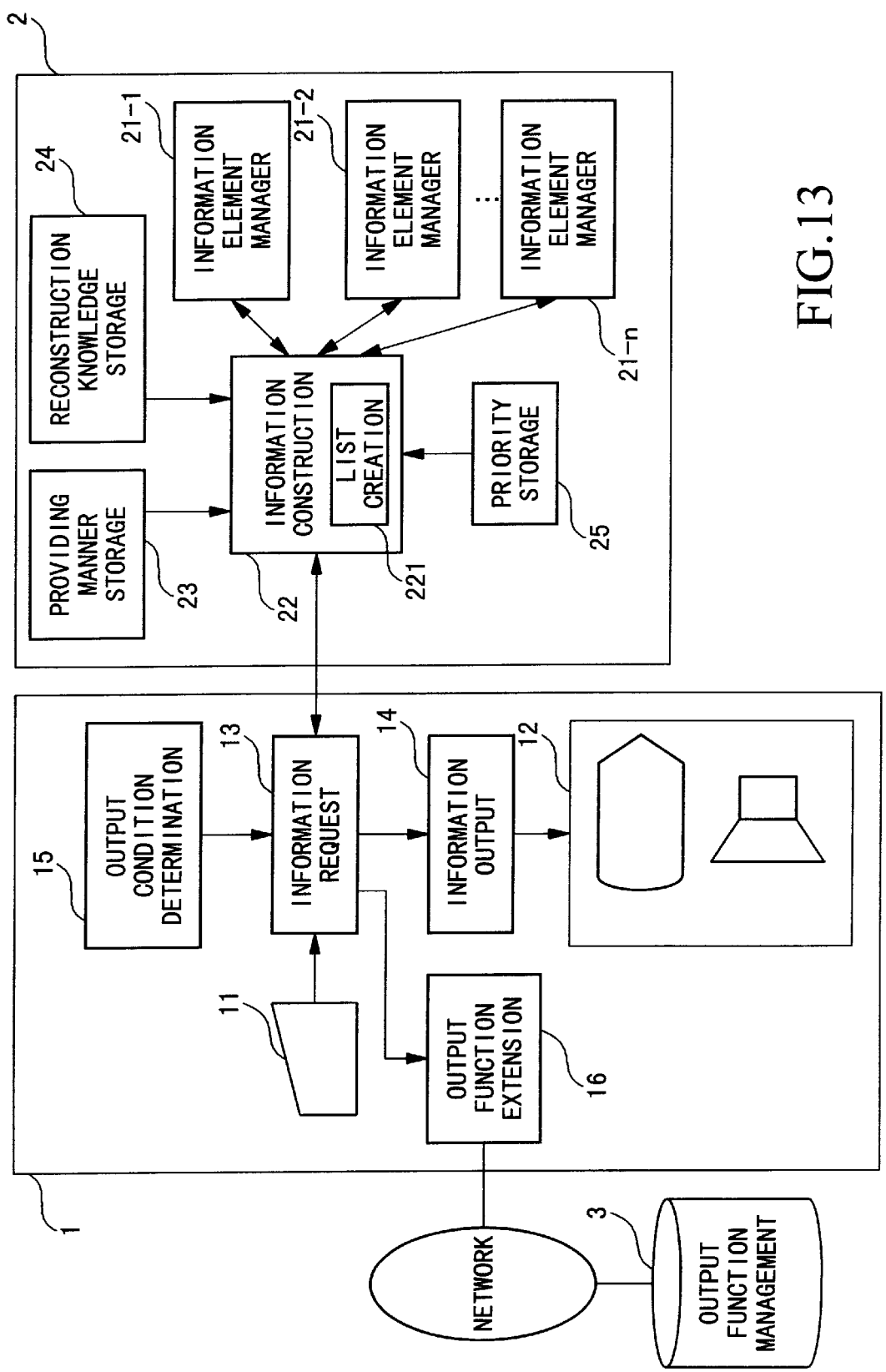
FIG. 13 is a block diagram showing a configuration of an information providing system in accordance with embodiment 2 of the invention.
Figures 14, 15:
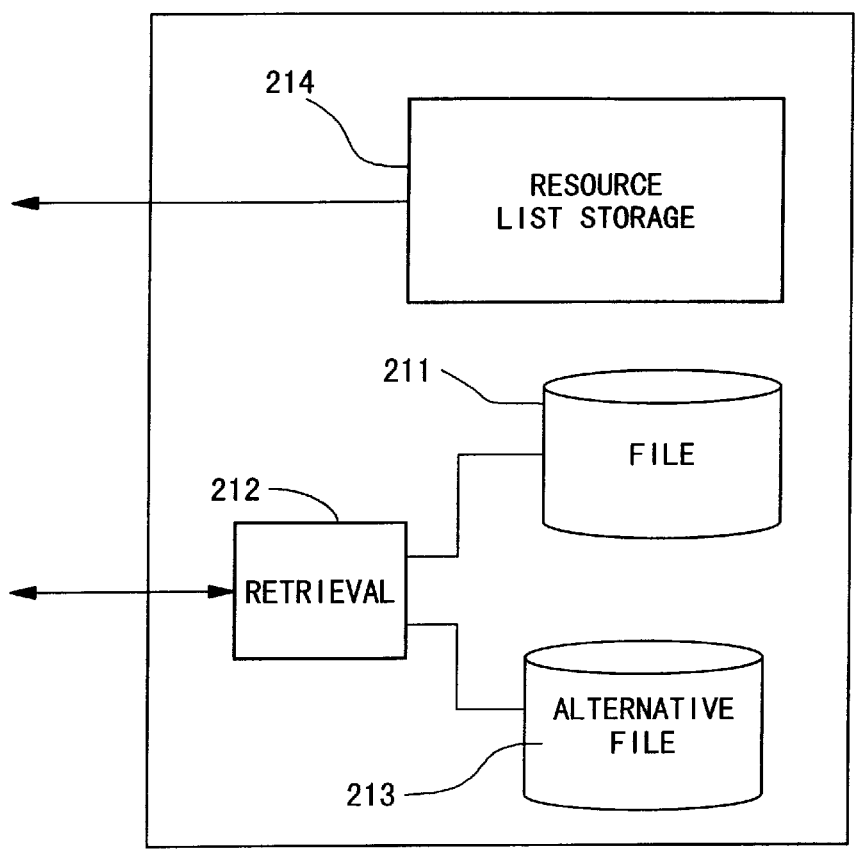
FIG. 14 is a block diagram showing a configuration used for each of information element managers, which are shown in FIG. 13.
FIG. 15 shows an example of a resource list describing resources to obtain software modules.

FIG. 13 is a block diagram showing a configuration of an information providing system in accordance with embodiment 2 of the invention, wherein parts equivalent to those of FIG. 1 are designated by the same reference symbols. As compared with the terminal 1 shown in FIG. 1, the terminal 1 shown in FIG. 13 additionally provides an output function extension unit 16. In addition, the information construction unit 22 is equipped with a list creation unit 221 that creates a resource list storing information and data with regard to resources that provide output functions. Further, each of the information element managers 21-1 to 21-$n$ is configured as shown in FIG. 14.

Now, a description will be given with respect to operation of the embodiment 2 of the invention, particularly, operation of the embodiment 2 that differs from the embodiment 1.

Some of the terminals do not preinstall software modules, which are required for outputting specific types of digital information. In general, an interpretation function is required for interpreting specific information which is described in accordance with a special format. However, in some case, the terminal do not preinstall software modules required for enabling output of all types of the specific information which are described in special formats. In order to enable output of the specific information, the general WWW browser, which is presently used, urges the user to download appropriate plug-in modules according to needs, so that the plug-in modules are installed into the browser. However, the general KIOSK terminals and TV type information output terminals do not allow dialogue-type manipulation to add the software modules. So, it is preferable that the software modules can be automatically added to those terminals.

For this reason, the present embodiment is designed to allow automatic download of the software modules in accordance with a method, which will be described below.

Each of the information element managers 21-1 to 21-$n$ is configured as shown in FIG. 14, wherein a storage unit 214 stores resources to obtain software modules, which the terminal 1 requires to output the digital information element managed each information element manager. So, when the information construction unit 22 extracts the digital information element, matched with the request given from the terminal 1, from the file 211 of the information element manager, the information construction unit 22 simultaneously extracts information regarding the resource to obtain the software module from the storage unit 214. Thus, the list creation unit 221 creates a resource list describing the resources to obtain the software modules. Then, the information construction unit 22 transmits the digital information, together with the resource list, to the terminal 1.

FIG. 15 shows an example of the resource list describing the resources to obtain the software modules. The resource list describes the resources to obtain software modules, which the terminal 1 requires to output different types of information respectively. Incidentally, the resource is expressed in the form of URL (i.e., Uniform Resource Locator).

Thus, the information request unit 13 of the terminal 1 receives the digital information, together with the resource list describing the resources to obtain the software modules, from the information storage equipment 2. Then, the information request unit 13 passes the resource list to the output function extension unit 16. The output function extension unit 16 pre-stores a software module list describing software modules that are preinstalled in the terminal 1. By performing comparison between the software module list with the resource list which is passed to the output function extension unit 16 from the information request unit 13, the output function extension unit 16 makes a decision as to whether the terminal 1 pre-installs all of the software modules, which are required for outputting the digital information presently provided from the information storage equipment 2, or not. If the terminal 1 pre-installs of the software modules, the terminal 1 communicates with the information request unit 13 to inform of a message that the terminal 1 pre-installs all of the software modules. If there exists a software module that is not installed in the terminal 1, the terminal 1 accesses an output function management unit 3 via a network. Herein, the output function management unit 3 is located at a position corresponding to the resource described in the resource list. Then, the terminal 1 downloads the corresponding software module by means of the output function management unit 3, so that the software module is installed into the information output unit 14. Thereafter, the output function extension unit 16 communicates completion of download to the information request unit 13.

The information request unit 13 forwards the digital information transmitted thereto from the information storage equipment 2 to the information output unit 14 when the information request unit 13 receives a message that the terminal 1 pre-installs all of the necessary software modules, or when it is informed of completion of download. The information output unit 14 executes the software module(s), which is pre-installed in the terminal 1, as well as the software module(s) which is presently downloaded. Thus, the information output unit 14 outputs the digital information by means of the output unit 12.

As shown in FIG. 14, each of the information element managers 21-1 to 21-*n* contains an alternative file 213 in addition to the file 211 storing the digital information element, which should be originally provided for the user. Herein, the alternative file 213 stored an alternative digital information element. For example, if the original digital information element represents sound information, the alternative digital information element represents character information substituting the sound information. If the original digital information element represents picture information, the alternative digital information element represents character information substituting the picture information. In the aforementioned embodiment 1 shown in FIG. 1, the information construction unit 22 excludes information which cannot be output under the output condition of the terminal in terms of hardware in step S12 shown in FIG. 8A. In contrast to the embodiment 1 of FIG. 1, the embodiment 2 of FIG. 13 is designed as follows:

The retrieval unit 212 accesses the alternative file 213 to retrieve the alternative digital information element substituting the information that cannot be output under the output condition of the terminal in terms of hardware. Thus, the "retrieved" alternative digital information can be provided for the user.

Thus, even if the terminal does not have a sound device such as a speaker, it is possible to inform the user of a fact that sound information is included in the provided digital information. In addition, it is possible to perform explanation of contents of sounds using the alternative digital information, by which it is possible to pass a certain degree of the contents of sounds to the user. Similarly, even if the terminal has a display unit that does not provide a picture output function, it is possible to inform the user of a fact that picture information is included in the provided digital information. In addition, it is possible to perform explanation of contents of pictures using the alternative digital information, by which it is possible to pass a certain degree of the contents of pictures to the user.

Figure 16:
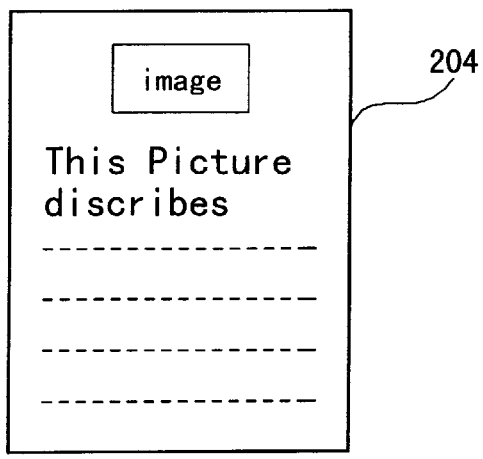
FIG. 16 shows an example of an image displayed on a display screen of the terminal which does not have a picture output function and which is provided with alternative digital information.

FIG. 16 shows an example of an image displayed on a display screen of the terminal, which does not have a picture output function and which is provided with alternative digital information. Herein, characters of a word "image" are displayed at a certain area overlapping with an area which is originally provided for displaying a picture. Thus, the user is capable of recognizing existence of the picture (or image).

[C] Modifications

This invention are described heretofore in accordance with the embodiment 1 and embodiment 2. However, this invention is not necessarily limited by those embodiments. Hence, it is possible to provide a variety of modifications, which will be described below.

(1) In the aforementioned embodiments, the information storage equipment 2 is provided as an independent device that is capable of performing direct communication with the terminal 1. It is possible to modify the embodiments such that the terminal 1 is equipped with the information storage equipment 2.

Figure 17:
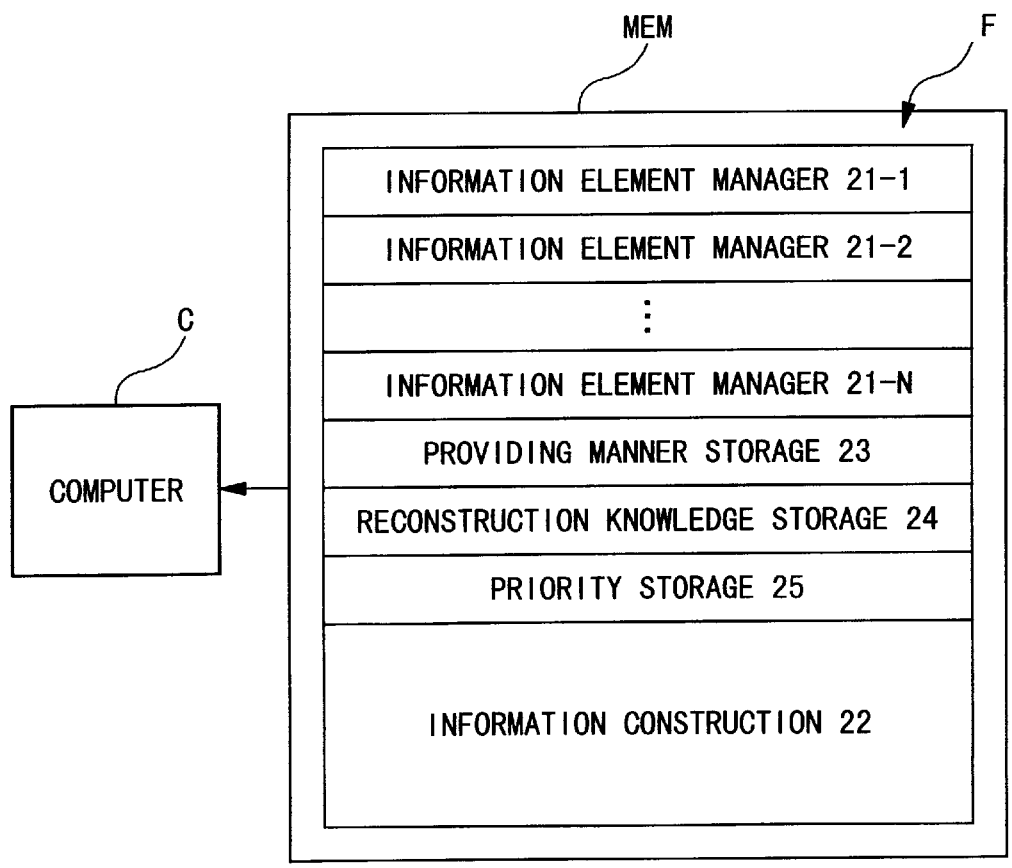
FIG. 17 is a block diagram showing an example of a system configuration actualizing functions of the information storage equipment using a computer and machine-readable recording media.

(2) It is possible to actualize functions of the information storage equipment 2 by a computer that runs programs stored in machine-readable recording media. An example of this modification is shown in FIG. 17. Herein, reference symbol "C" designates a computer while "MEM" designates machine-readable recording media such as the CD-ROM and magneto-optical disk. In addition, reference symbol "F" designates files stored in the machine-readable recording media MEM. The files F store data and programs that actualize the aforementioned units of the information storage equipment 2 such as the information element managers 21-1 to 21-*n*, the providing manner storage unit 23, the reconstruction knowledge storage unit 24, the priority storage unit 25 and the information construction unit 22. Thus, the computer C reads the data and programs stored in the files F so as to control operations thereof. Thus, it is possible to actualize the information storage equipment as shown in FIG. 1 and FIG. 13 on the computer C.

Figure 18:
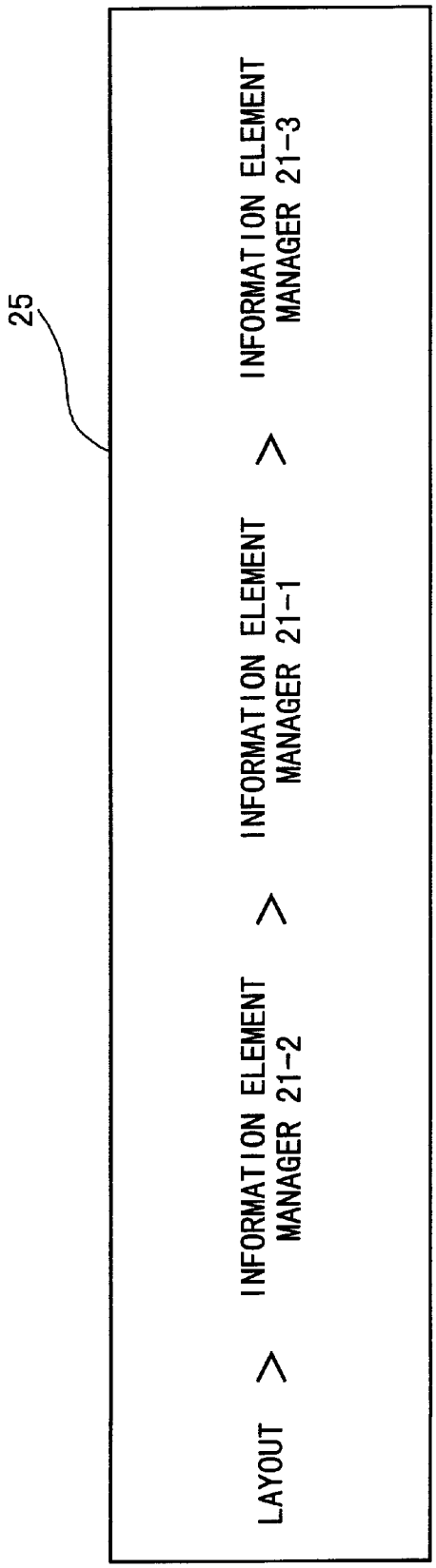
FIG. 18 shows a modified example of the relationship between the information element managers in accordance with the mutual priority as well as layout priority.
Figure 19:
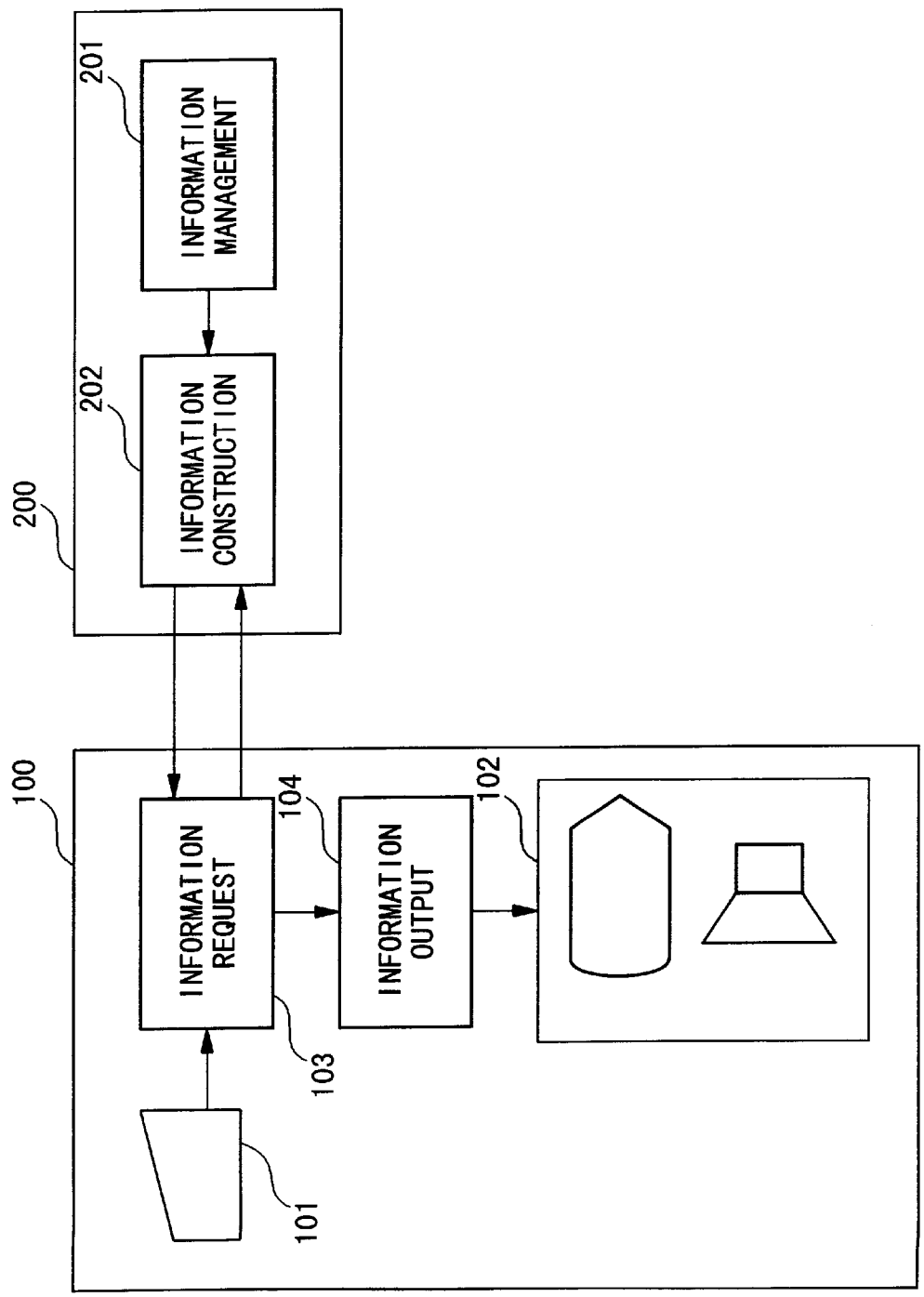
FIG. 19 is a block diagram showing an example of the information providing system.
Figure 20:
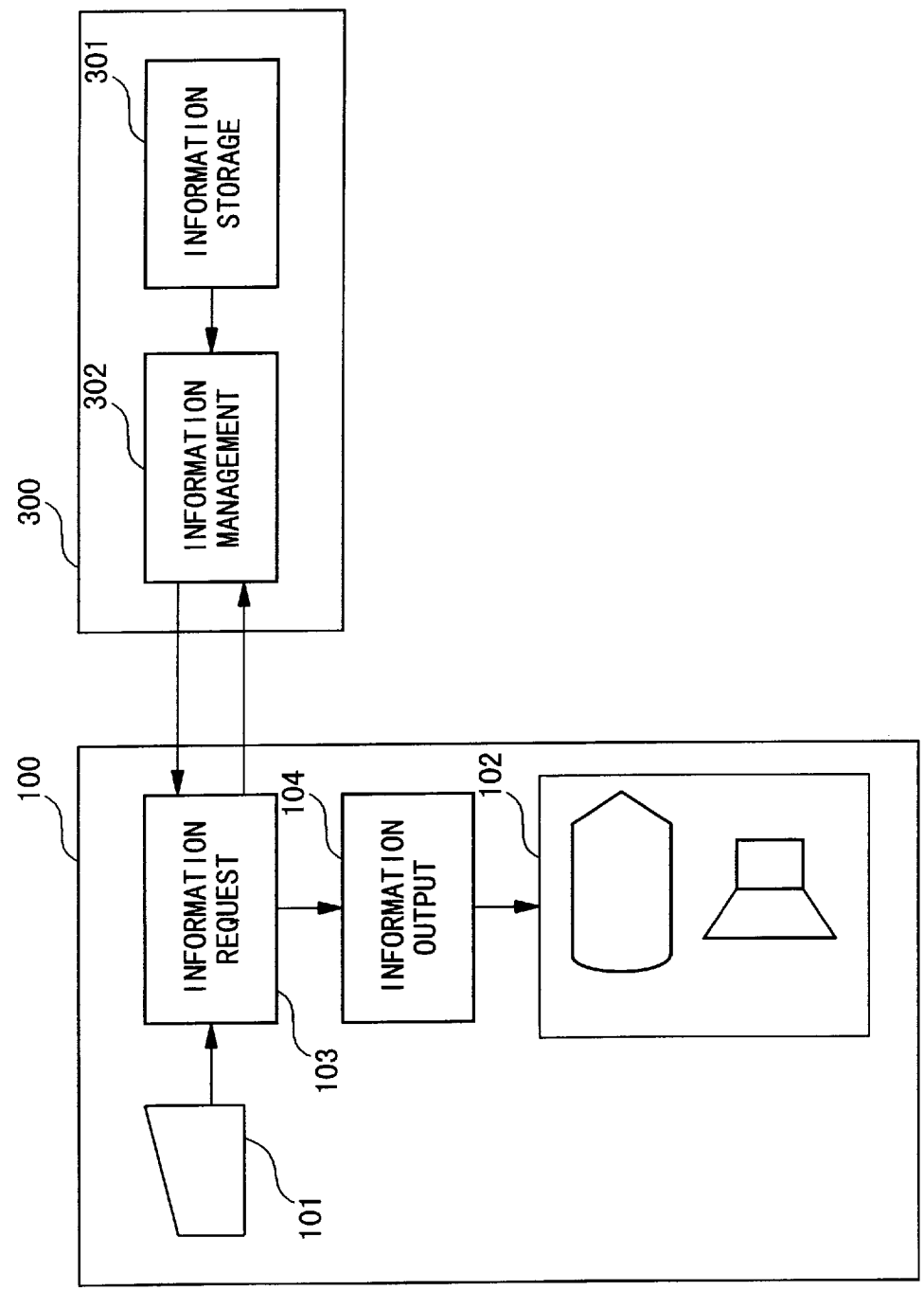
FIG. 20 is a block diagram showing another example of the information providing system.

(3) In the aforementioned embodiments, the change methods to change the default providing manner are selected in consideration of only the mutual priority mutually set between the information element managers. Herein, it is possible to newly introduce the concept of "layout", according to which contents of priority-implemented objects (e.g., information element managers) are arranged in a limited plane or a limited space in accordance with a layout priority. So, it is possible to select one of the change methods in consideration of the mutual priority as well as the layout priority. For example, the aforementioned content of priority shown in FIG. 6 is modified to FIG. 18. In FIG. 18, the layout priority is the highest. Therefore, the information storage equipment firstly employs the change methods (e.g., change methods 12, 23 shown in FIG. 5B) that do not change the layout.

Lastly, this invention can offer a variety of effects, which will be described below.

(1) It is possible to provide the user with the digital information in an information providing manner suited to the output condition of the terminal. Because, this invention is designed such that at an information request mode, the terminal transmits the output condition thereof to the information storage equipment, so that the information storage equipment is capable of recognizing the output condition of the terminal that issues the request. Thus, the information storage equipment is capable of changing the default providing manner in response to the output condition.

(2) Even if the information storage equipment changes the default providing manner in response to the output condition of the terminal, it is possible to employ the default providing manner in a number of situations without substantially changing the information providing manner set to the digital information element that the user considers important within multiple digital information elements extracted from the information element managers respectively. Because, this invention sets the mutual priority between in information element managers, so it is capable of determining one of the change methods, stored in the reconstruction knowledge storage unit, in consideration of the mutual priority.

(3) It is possible to cope with shortage of the output functions that the terminal requires to output information. Because, the information storage equipment is capable of providing the terminal with the alternative digital information when the terminal is short of the necessary output functions in terms of hardware. If the terminal is short of the necessary output functions in terms of software, the information storage equipment creates a resource list describing resources to obtain software modules, which is sent to the terminal. Thus, the terminal is capable of downloading the necessary software modules from the resources corresponding to the output functions that the terminal requires.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. An information providing system comprising:
    a terminal for issuing an information obtainment request with regard to desired digital information, wherein the information obtainment request is transmitted together with an output condition of the terminal;
    an information storage equipment for storing and managing digital information, which should be provided for a user of the terminal in response to the information obtainment request,
    wherein said information storage equipment further comprises
    a plurality of information element managers for storing and managing a plurality of digital information elements respectively,
    providing manner storage means for storing a default providing manner by which the digital information elements respectively extracted from the information element managers are synthesized together and are provided for the user,
    reconstruction knowledge storage means for storing a plurality of change methods, each of which changes the default providing manner in response to the output condition of the terminal,
    priority storage means for storing mutual priority set for a prescribed number of the information element managers, and
    information construction means for accessing the information element managers to extract the digital information elements suited to the information obtainment request given from the terminal, wherein if the output condition of the terminal matches with the default providing manner, the information construction means synthesizes the extracted digital information elements in accordance with the default providing manner to construct digital information, which is transmitted to the terminal, while if the output condition of the terminal does not match with the default providing manner, the information construction means selects one of the change methods in consideration of the mutual priority so as to change the default providing manner in response to the selected change method, so that the information construction means synthesizes the extracted digital information elements in accordance with the changed providing manner to construct digital information, which is sent to the terminal.

2. An information providing system according to claim 1, wherein the information element manager stores alternative digital information element other than the original digital information element thereof, so that if the information construction means determines that original digital information corresponding to the original digital information element cannot be provided for the user under the output condition of the terminal, the information construction means provides the user with alternative digital information corresponding to the alternative digital information element instead of the original digital information.

3. An information providing system according to claim 1 or 2, wherein the information element manager stores information regarding a resource to obtain a software module required for outputting the digital information element thereof, while the information construction means simultaneously obtains information regarding resources of software modules when extracting the digital information elements, suited to the information obtainment request given from the terminal, from the information element managers respectively, so that the information construction means creates a resource list describing the resources of the software modules, and wherein if the terminal does not have a necessary software module required for outputting the digital information transmitted thereto from the information storage equipment, the terminal is capable of downloading the necessary software module from a resource which is listed on the resource list.

4. A machine-readable media storing programs that cause a computer to act as an information storage equipment, which comprises
    a plurality of information element managers for storing and managing a plurality of digital information elements respectively,
    providing manner storage means for storing a default providing manner by which the digital information elements are extracted from the information element managers respectively and are then synthesized and provided for a user,
    reconstruction knowledge storage means for storing a plurality of change methods, each of which changes the default providing manner in response to an output condition of a terminal,
    priority storage means for storing mutual priority set for a prescribed number of the information element managers, and
    information construction means for extracting the digital information elements, suited to an information obtainment request given from the terminal, from the information element managers respectively, wherein if the default providing manner matches with the output condition of the terminal, the information construction means synthesizes the extracted digital information elements to construct digital information, which is transmitted to the terminal, while if the default providing manner does not match with the output condition of the terminal, the information construction means selects one of the change methods in consideration of the mutual priority so as to change the default providing manner in accordance with the selected change method, so that the information construction means synthesizes the extracted digital information elements in accordance with the changed providing manner to construct digital information, which is transmitted to the terminal.

5. An information providing system comprising:
    a terminal being manipulated by a user for providing the user with content of digital information in accordance with an output condition thereof, which is defined by a picture output function and/or a sound output function which are equipped in the terminal; and an information storage equipment for storing and managing multiple types of the digital information, wherein the information storage equipment further comprises a plurality of information element managers for storing and managing a plurality of digital information elements respectively, and information construction means for extracting the digital information elements, suited to an information obtainment request issued by the terminal, from a prescribed number of the information element managers respectively, so that the information construction means synthesizes the extracted digital information elements to construct digital information in accordance with a default providing manner, which is set in advance, whereby the digital information is transmitted to the terminal and is provided for the user in accordance with the output condition.

6. An information providing system according to claim 5, wherein the default providing manner represents a specific format of a display screen whose screen size and layout are determined in advance.

7. An information providing system according to claim 5, wherein the information storage equipment further comprises storage means for storing a plurality of change methods as well as mutual priority consisting of priorities set for the prescribed number of the information element managers respectively, so that if the default providing manner does not match with the output condition of the terminal, the information construction means selects one of the change methods so as to change the default providing manner by the selected change method, whereby the information construction means synthesizes the extracted digital information elements in accordance with the changed providing manner to construct digital information, which is transmitted to the terminal.

8. An information providing system according to claim 7, wherein the information construction means selects one of the change methods in such a way that the selected change method does not substantially influence at least one information element manager given a high priority.

9. An information providing system according to claim 5 or 7, wherein the information storage equipment further comprises resource list creation means for creating a resource list describing resources to obtain software modules that the terminal requires to output the digital information elements of the information element managers respectively, while the terminal further comprises output function extension means for downloading a necessary software module, which the terminal requires, from one of the resources described in the resource list, so that the necessary software module is installed in the terminal to output the digital information.

10. An information providing method comprising the steps of:

providing a plurality of digital information elements to suit an information obtainment request given from a terminal;

making a decision as to whether a default providing manner matches with an output condition of the terminal or not, wherein the default providing manner represents a specific format of a display screen whose screen size and layout are determined in advance while the output condition of the terminal is defined by a picture output function and/or a sound output function which are equipped in the terminal;

synthesizing the plurality of digital information elements to construct digital information in accordance with a default providing manner if the default providing manner matches with the output function of the terminal;

changing the default providing manner to suit the output condition of the terminal if the default providing manner does not match with the output condition of the terminal, so that the plurality of digital information elements are synthesized together into the digital information in accordance with the changed providing manner; and transmitting the digital information to the terminal, so that the terminal provides the user with the digital information.

11. An information providing method according to claim 10 further comprising the step of:

selecting one of change methods in consideration of mutual priority set for a prescribed number of the information element managers from which the digital information elements are extracted, so that the default providing manner is changed by the selected change method.

12. An information providing method according to claim 10 or 11 further comprising the step of:

downloading a necessary software module, which the terminal requires to provide the digital information for the user, from a resource.

* * * * *